J. BETTY.
AUTOMATIC DOOR FOR STALLS.
APPLICATION FILED JUNE 11, 1913.

1,116,220.

Patented Nov. 3, 1914.

Witnesses:
Geo. J. Hutink.
Marie Battey.

Inventor
John Betty.
by Hazard & Strause,
Attys.

UNITED STATES PATENT OFFICE.

JOHN BETTY, OF LOS ANGELES, CALIFORNIA.

AUTOMATIC DOOR FOR STALLS.

1,116,220.  Specification of Letters Patent.  Patented Nov. 3, 1914.

Application filed June 11, 1913.  Serial No. 773,065.

*To all whom it may concern:*

Be it known that I, JOHN BETTY, a citizen of the United States, residing at Los Angeles, in the county of Los Angeles and State of California, have invented new and useful Improvements in Automatic Doors for Stalls, of which the following is a specification.

This invention relates to automatic doors for stalls adapted to contain domestic animals, and the principal object is to provide a stall with movable doors one of which is automatically closed when the other is opened.

It is also an object to provide an animal stall with an inner and outer door, the opening of the latter automatically closing the inner gate or door.

It is a further object to provide means for automatically releasing the halter strap by which the animal is secured in the stall, and a free opening is provided for the escape of the animal from the building.

Figure 1:
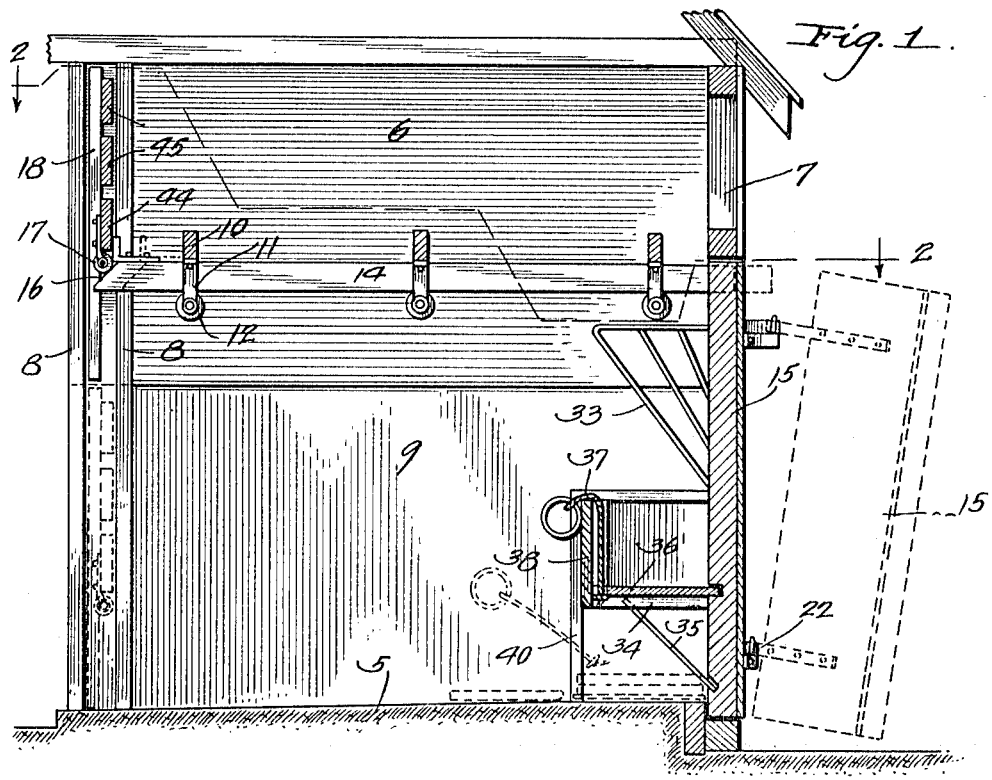
Figure 2:
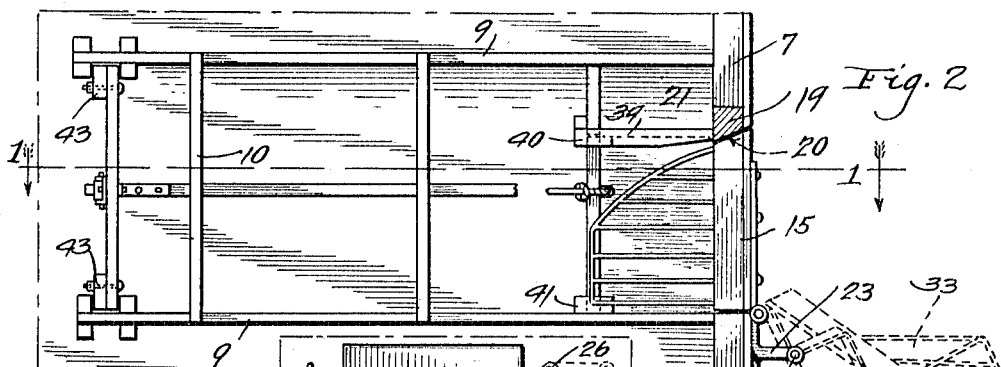
Figure 3:
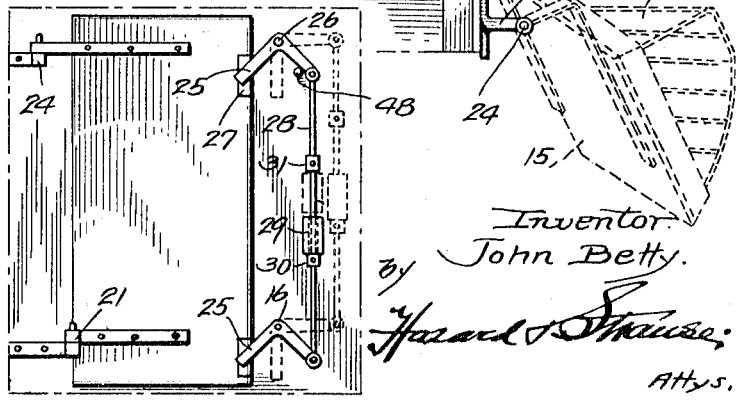

In the drawings accompanying this specification and forming therewith the application for Letters Patent: Figure 1 is a longitudinal vertical section on the line 1—1 of Fig. 2, through an animal stall having the invention applied thereto. Fig. 2 is a section on the line 2—2 of Fig. 1, this view also showing the releasing position in dotted lines. Fig. 3 is a view of the elevation of the outer door and its securing means.

It is well known in the handling of domestic animals that when fires occur within their domicile that they are prone to become confused and get into the fire rather than escape through openings provided exteriorly. This invention overcomes the above difficulties in providing a gate to the stall to automatically close when the exterior opening is opened.

More specifically in the drawings, 5 designates the ground forming the floor interiorly of the structure or barn 6, having the outer vertical wall 7 and the interior frames or supports 8 intermediate of which are provided the partitions 9 which segregate the space into stalls of the desired size and configuration.

Extending transversely in the building parallel with the outer walls are a plurality of beams 10 from which depend brackets 11 which support the rollers 12. Slidably mounted on these rollers 12 is a bar 14 having its outer end squared to engage the exterior door 15, the inner end being inclined to form a cam surface 16 which is adapted to engage a roller 17 on the sliding gate 18. The door 15 is adapted to form an exit from the stall between two partition walls 9 and is preferably hinged on the exterior of the building at a point in line with one side of the stall, a door jamb 19 being provided intermediate of these two partitions against which the inclined edge 20 of the door abuts and limits its movement in relation to the wall 7, the opening being of such width and height as to readily allow the passage of an animal, the door jamb 19 being spaced a sufficient distance from the adjacent partition 9 to permit of the permanent feed box 21 usually provided at the head of animal stalls for grain feeding. The door preferably extends below the raised floor 5 of the stall and a sufficient distance above the ground exteriorly to accommodate the free movement of the door, as clearly shown by the dotted lines in Fig. 1, the lower hinge 22 being of the common pivotal type, while the upper hinge 23 is provided with an angular extension so that its pivot 24 is spaced away from the hinge edge of the door and outwardly from the wall. To lock this door in closed position a plurality of latches 25 are provided preferably of the bell crank form shown, pivoted at the point 26, one arm engaging with plates 27 secured to the adjacent face of the door, the oppositely disposed arms being connected by a rod 28. This rod is preferably provided with a weight 29 which has a bore therethrough so that it can be slidably mounted upon the rod, its movement being limited by two sleeves 30 and 31, this weight being provided as a hammer which may be lifted quickly and force the latches 25 to assume the position shown in dotted lines releasing the door. A pin 48 is preferably provided in the outer walls to limit the downward movement of the arms of the latches supporting the rod 28 and its weight.

Attached to the inner portion of the door is a hay rack 33 and a bracket 34 provided with a loosely mounted supporting pin 35, a plurality of these brackets being preferably provided, upon which rests the floor 36 of the manger. This floor is provided with a slot oppositely disposed from the door in which is adapted to be inserted in the groove provided the knotted or enlarged end of the halter rope 37. Within the front of the manger a wall 38 is secured in position, being so notched on its lower edge that it rests upon the brackets 34, the upper edge engaging under the batten 39 secured to the side of the grain box 21, suitable vertical supports 40 and 41 forming the outer support for the plate 38. The rod 35 is normally seated in a socket in the door and the socket in the lower side of the bracket 34, this tending to hold the front wall 38 of the manger in operative position and securing the end of the halter rope as shown. The sliding gate or door 18 as shown consists of the side pieces 43 which are adapted to slide in a guideway formed by the adjacent uprights 8, the roller 17 being supported upon the lower cross bar 44, a plurality of cross bars 45 being preferably provided so that when the gate is dropped it will effectively close the interior end of the stall.

The operation of the device will be readily understood from the drawings and description. When the door 15 is closed the manger is effectively held in the proper relation with the halter strap secured therein, the gate 18 being elevated so that the animal may be secured within the stall and properly fed. Upon the appearance of fire within the building, or from any other cause the releasing of the animals is desired through the exterior doors, one person may rapidly pass and by operating the weight 29 to each door release a large number of such doors adapted to contain a corresponding number of animals, and as soon as the normally open end of the stall has been closed by the releasing of the gate 18 the animal must pass through the opening provided, the bracket, floor and front of the manger being released by the opening of the door 15, which normally falls outward on account of the unbalanced hinging means, the halter rope also being released with the opening of the door and the collapse of the unlocked portions of the manger.

What I claim is:

1. In an automatic animal releasing mechanism in combination with a stable having a stall, of a door adapted to form an exit for the front end of said stall, a vertically slidable rear gate and a horizontally reciprocable member adapted to be held against movement by the door when the latter is closed and having an inclined face on which the gate is adapted to be supported in an elevated position when the door is closed, said gate operating to shift the reciprocal member to automatically release the gate therefrom when the door is open.

2. In an automatic animal releasing mechanism in combination with a stable having stalls and an exterior wall provided with an opening forming an exit from said stall, of a hinged closure to said opening, means to secure said closure, a slidably mounted latch adapted to engage said closure, a sliding gate supported by said latch in relation to the normally opened end of said stall, and means to release said exterior closure, whereby said gate will fall and effectively close the normally open entrance to said stall.

3. In an automatic animal releasing mechanism in combination with a stable having stalls and an exterior wall provided with an opening forming an exit from said stall, a hinged closure to said opening, means to secure said closure, a slidably mounted latch adapted to engage said closure, a sliding gate supported in relation to the normally open end of said stall, a box formed of collapsible members mounted in relation to said closure, means to secure a halter rope in relation to said collapsible members, and means to release said closure, whereby said gate will be closed and said halter rope released by the collapse of said box members.

In witness that I claim the foregoing I have hereunto subscribed my name this 29th day of May, 1913.

JOHN BETTY.

Witnesses:
W. P. KEENE,
MARIE BATTEY.

---

Copies of this patent may be obtained for five cents each, by addressing the "Commissioner of Patents, Washington, D. C."